United States Patent [19]
Jatczak et al.

[11] 3,954,517
[45] May 4, 1976

[54] METHOD FOR MAKING CARBURIZED BEARING MEMBERS

[75] Inventors: Chester F. Jatczak; Jesse A. Burnett, both of North Canton; Terry W. Mohr, Canton, all of Ohio

[73] Assignee: The Timken Company, Canton, Ohio

[22] Filed: July 22, 1975

[21] Appl. No.: 598,067

[52] U.S. Cl.............................. 148/16.5; 75/128 V; 75/128 W; 148/36; 148/39; 148/143
[51] Int. Cl.²................. C23C 11/12; C22C 38/44; C22C 38/46
[58] Field of Search..................... 75/128 V, 128 W; 148/16.5, 143, 36, 39

[56] References Cited
UNITED STATES PATENTS

| | | | |
|---|---|---|---|
| 2,624,687 | 1/1953 | McMullan | 75/128 W X |
| 3,382,064 | 5/1968 | Jatczak | 148/16.5 X |

FOREIGN PATENTS OR APPLICATIONS

| | | | |
|---|---|---|---|
| 47-26925 | 10/1972 | Japan | 75/128 V |

Primary Examiner—Arthur J. Steiner
Attorney, Agent, or Firm—Brown, Murray, Flick & Peckham

[57] ABSTRACT

Alloy for carburized bearing members intended to be used at operating temperatures up to 1000°F, characterized in having the ability to achieve and retain high surface hardness after carburization coupled with good hot-workability which enables billets formed from the alloy to be pierced in a seamless tube-forming operation. Also described is the method for heat treating such an alloy to achieve the desired surface hardness, on the order of Rockwell C58 and higher. The alloy contains, as essential constituents, 0.1 to 0.3% carbon, 0.2 to 1% manganese, 0.2 to 0.6% silicon, from an effective amount up to 1.2% chromium, 2.5 to 3.5% nickel, 4 to 6% molybdenum and 0.25 to 0.85% vanadium.

2 Claims, 7 Drawing Figures

TYPICAL CARBON GRADIENT OBTAINED BY CARBURIZING

HARDNESS VS TEMPERING PARAMETER
PARAMETER $T(20 + \log t) \times 10^{+3}$

HOT TWIST TEST RESULTS

METHOD FOR MAKING CARBURIZED BEARING MEMBERS

BACKGROUND OF THE INVENTION

While not limited thereto, the present invention is particularly adapted for use as a steel for roller bearing races which typically have a wall thickness of 1 inch or less for bearings having an O.D. of about 5 inches. Such bearing races should have a relatively soft inner matrix, a carburized outer surface having a Rockwell C hardness of least 58 and the ability to retain properties such as hardness at operating temperatures in the range of 800°F to 1000°F. The steel used for the races must meet two requirements. First, it must be capable of being carburized and heat treated to achieve the desired surface hardness. Secondly, it must be capable of being pierced in a seamless tube-forming operation to achieve the desired wall thickness. This latter parameter is measured by the hot twist tests. If the twist characteristics of the alloy are unsatisfactory, the only way in which a bearing race can be produced is by a costly machining operation on solid bar stock or by ring forging from a billet.

In Jatczak U.S. Pat. No. 3,382,064 a steel alloy is described for bearing races which can be readily carburized such that it is adapted for continuous operation at temperatures up to 800°F to 900°F, or for intermittent operation at 1000°F. It contains as essential constituents, carbon, manganese, silicon, chromium, molybdenum, and vanadium. Although the steel described in the aforesaid patent can be carburized to achieve the desired hardness for bearing operation at high temperatures, its twist data characteristics are not altogether satisfactory with the result that hot piercing operations can be achieved only with difficulty.

In McMullan U.S. Pat. No. 2,624,687, another bearing steel is disclosed having a composition similar to that of Pat. No. 3,382,064 but wherein vanadium and aluminum are not employed as alloying elements, and nickel is added. The purpose of the nickel, according to the McMullan patent, is as an austenite forming element which increases carbon or carbide solubility at lower temperatures, offsetting the reverse effect of molybdenum and chromium.

One drawback of the steel disclosed in the aforesaid McMullan U.S. Pat. No. 2,624,687 is that it contains 1 to 3% chromium and preferably 1.5% chromimum. This amount of chromium increases the difficulty encountered in carburizing and tends to cause grain boundary carbides. Another difficulty with the vanadium free steel of the McMullan patent is that it cannot fully utilize the secondary hardening phenomenon resulting from precipitation of alloy carbides on tempering or aging after hardening by quenching from high austenitizing temperatures. The reasons for this are twofold: (1) it cannot be austenitized from temperatures above 1750°F without excessive grain growth and (2) temperatures around 2000°F are required to produce the solution of the carbide forming elements which induce high secondary hardening on tempering.

Some of the disadvantages of the steel of McMullan are eliminated in Jatczak U.S. Pat. No. 3,382,064. For example, the addition of vanadium impedes grain growth and permits the steel to be quenched from higher temperatures (i.e., 2100°F) during hardening; and it contains lower amounts of chromium which contributes to a greater ease of carburization. On the other hand, as was pointed out above, the steel of U.S. Pat. No. 3,382,064 is not readily pierceable in a seamless tube-forming operation as measured by hot twist data. Thus, both of the foregoing prior art steels and the processes set forth in the respective patents have deficiencies in certain respects.

SUMMARY OF THE INVENTION

In accordance with the present invention, a new and improved bearing steel is provided which has good hot piercing capability and at the same time can be carburized and heat treated to achieve the requisite surface hardness for bearing operation at temperatures up to 1000°F. The steel contains, as essential constituents, carbon, manganese, silicon, chromium, molybdenum and vanadium, together with nickel which is added primarily to facilitate a hot piercing operation.

For carburizing, the steel of the invention is normally preheated in air to the carburizing temperature (1650°F or higher), held for at least 30 minutes, at which point the carburizing gas is introduced for a time necessary to give the proper case depth. In the hardening process, the steel is heated to 2000°F, then quenched in oil and finally refrigerated to a temperature of −100°F to −120°F. Heating to 2000°F without substantial grain growth is possible because of the addition of vanadium; while refrigeration to −100°F or lower is effected to transform austenite to martensite in the carburized portions of the bearing part. Following the hardening, the parts are triple tempered at 1000°F for two hours at each temper and then finish ground.

The above and other objects and features of the invention will become apparent from the following detailed description taken in connection with the accompanying drawings which form a part of this specification, and in which.

Figure 3:
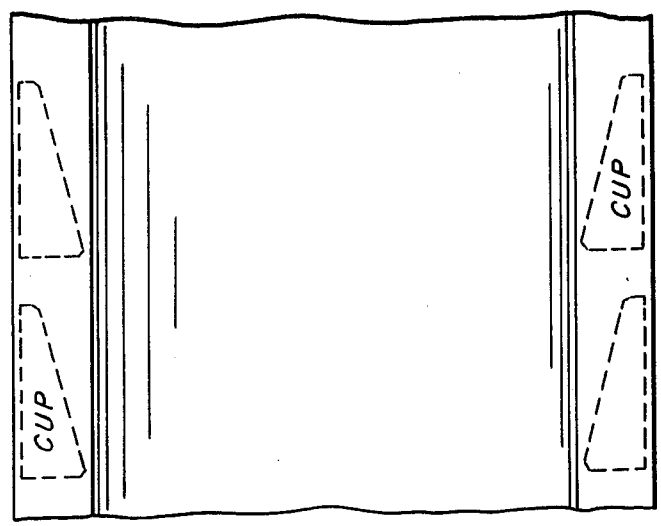
FIG. 3 shows the manner in which the cup of the bearing construction of FIG. 1 is formed from seamless tubing.
Figure 2:
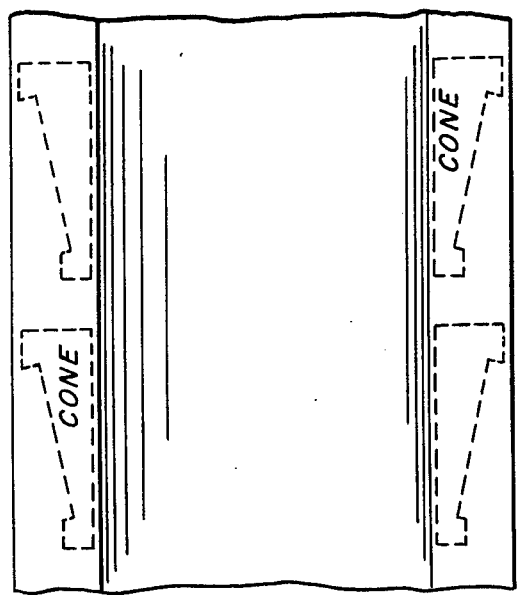
FIG. 2 shows the manner in which the cone of the bearing construction of FIG. 1 is formed from seamless tubing.
Figure 1:
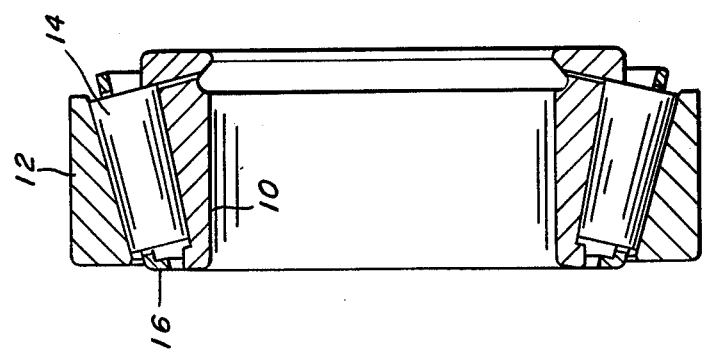
FIG. 1 is a typical bearing construction which can be formed from the steel of the invention.

With reference now to the drawings, and particularly to FIG. 1, a typical roller bearing construction is shown which includes four basic components. These are the inner race or cone 10, the outer race or cup 12, the tapered rollers 14 and the roller retainer or cage 16. Both the cone and the cup are formed from seamless tubing as shown in FIGS. 2 and 3. Initially, the steel of the invention is formed into a seamless tube. Thereafter, it is machined to form the cones shown in FIG. 2. The same is true of the cups shown in FIG. 3. That is, the seamless tube is initially formed and then machined to form the cross-sectional configurations of the cups.

As was explained above, bearings (5 inches O.D. or less) require a seamless tube such as that shown in FIG. 2 or FIG. 3 having a wall thickness of one inch or less.

Bearings of this sort are particularly important in aerospace and the like applications where weight is a consideration. In order to form a roller bearing, either the central bore 18 shown in FIGS. 2 and 3 can be machined from solid bar stock or the tubing from which the cones and cups are formed can be formed in a seamless piercing operation. Obviously, the latter is much less expensive and is to be desired; however, difficulty has been experienced in obtaining a steel which is readily hot pierceable as measured by hot twist data and at the same time has the requisite characteristics to achieve carburization and the desired surface hardness.

The steel of the present invention which does achieve the foregoing desirable characteristics of hot pierceability and high surface hardness has the following broad and preferred ranges of composition, but may contain such minor elements as S, P and Al which are considered residuals in the state of the art:

|    | Broad   | Preferred | Typ. |
|----|---------|-----------|------|
| C  | .10/.30 | .10/.16   | .14  |
| Mn | .2/1.0  | .40/.60   | .50  |
| Si | .2/.6   | .4/.6     | .50  |
| Cr | 0/1.2   | .90/1.2   | 1.0  |
| Ni | 2.5/3.5 | 2.75/3.25 | 3.0  |
| Mo | 4.0/6.0 | 4.0/5.0   | 4.5  |
| V  | .25/.85 | .25/.50   | .35  |
| Fe | Bal.    | Bal.      |      |

Figure 4:
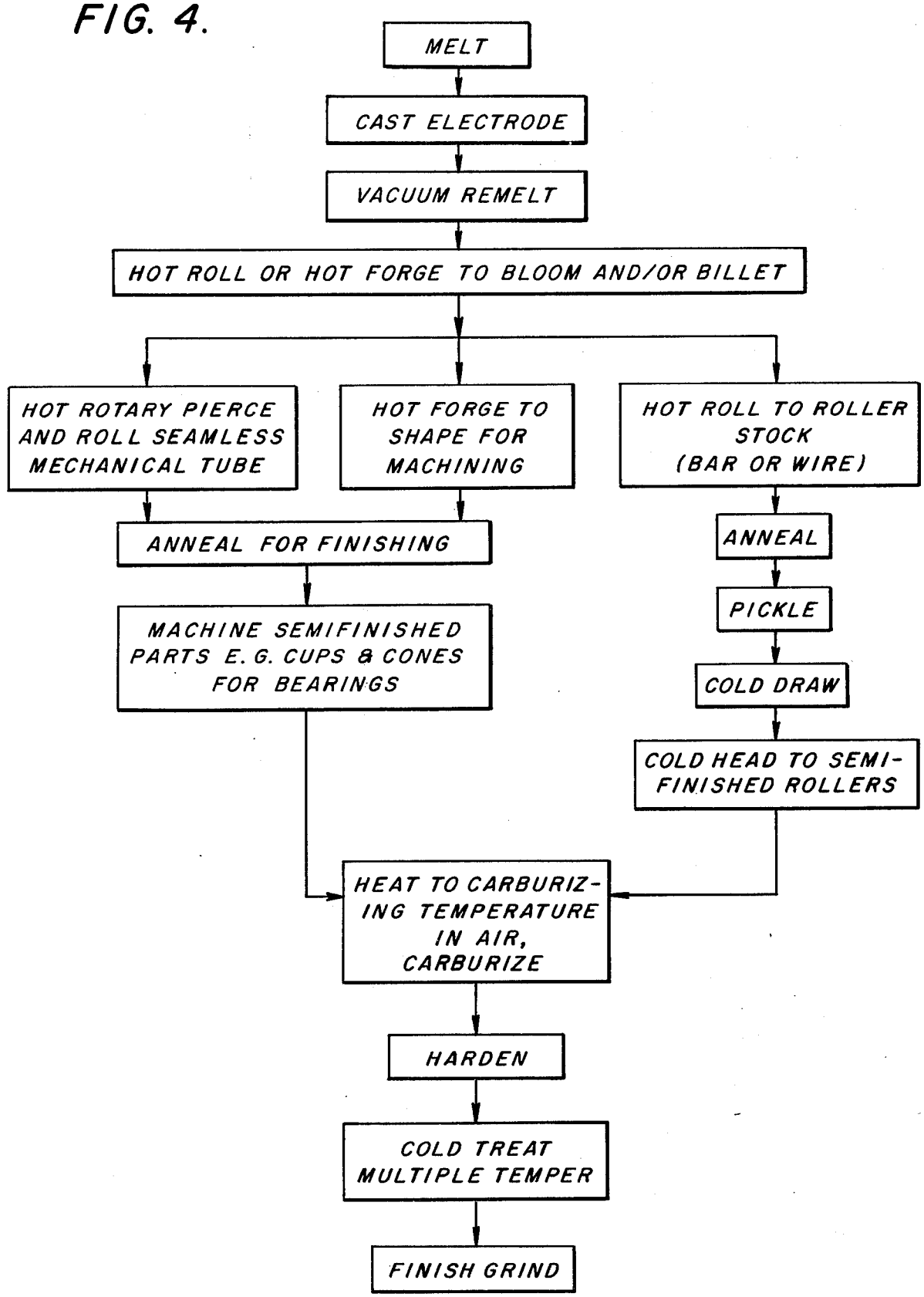
FIG. 4 is a flow diagram of the processing steps utilized on the steel of the invention.
Figure 5:
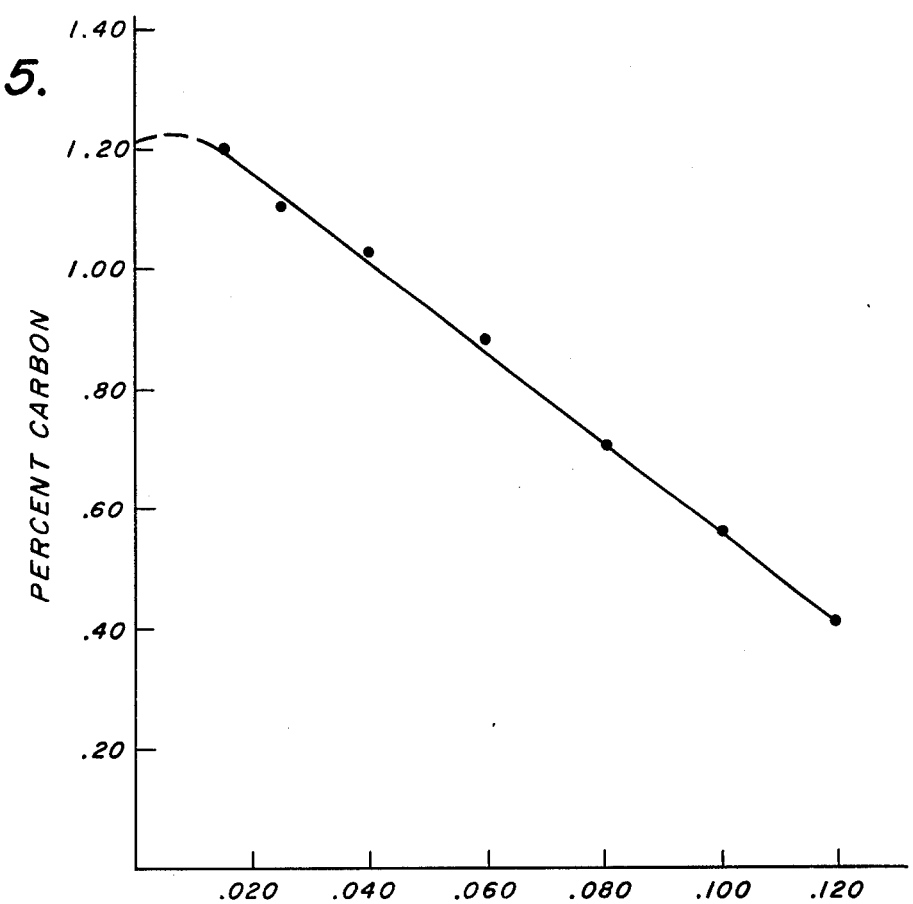
FIG. 5 shows the carbon gradient for a typical carburizing cycle with the steel of the invention.

The processing steps from the melting of the alloy to the final finish grinding of cup and cone bearing elements is shown by the flow diagram of FIG. 4. By reference to the flow diagram, it will be seen that after the steel of the invention is initially melted and cast into a consumable electrode, it is then remelted in a consumable electrode furnace. Thereafter, it is hot rolled or hot forged into a bloom and/or billet. At this point, the billets can be hot rotary pierced and rolled into seamless tubing or hot forged to shape for machining. Forging or piercing is at 2200°F to 2250°F with a finishing temperature between 1700°F and 1900°F. Thereafter, the tubing or forging, as the case may be, is annealed by heating to 1650°F, thereafter furnace cooled to 1350°F and cooled at the rate of 30°F per hour to 1100°F, and finally air-cooled. In the case of hot roller stock used to form rollers, the annealing process is the same as that described above, followed by pickling, cold drawing and cold heading to semi-finished rollers.

In the case of pierced seamless tubing, the tubing is machine finished after annealing to form the cups and cones shown in FIGS. 2 and 3. The machined parts are then ready for carburizing. In the carburizing step itself, the parts are heated in air to a temperature of about 1650°F or higher, and held at temperature (at least 30 minutes). Then, a methane or a like atmosphere is introduced for a given time to produce the desired case depth.

Following carburization, the parts are hardened by initially preheating to the range of about 1450°F to 1550°F to equalize, followed by rapid heating to about 2000°F. The parts are held at this temperature of 2000°F for about 10 minutes. It is possible to heat the parts in this way to a temperature of 2000°F without materially increasing grain size because of the presence of vanadium in the alloy composition. At the same time, the temperature prior to quenching is less than that specified, for example, in Jatczak U.S. Pat. No. 3,382,064. Following heating to 2000°F, the parts are quenched in oil and then refrigerated to a temperature of −100°F to −120°F and held at that temperature for 1 hour per inch of thickness. This is necessary to transform austenite in the outer case to martensite.

Following refrigeration, the product is then tempered in a triple temper process consisting of heating the parts to 1000°F for 2 hours during each temper. The parts are cooled to room temperature between cycles. In the tempering process, alloy carbide precipitation occurs in the microstructure. This imparts resistance to softening for long time service (approximately 1000 hours) at temperatures up to 900°F and for intermittent short times at 1000°F. Finally, the parts are finish ground and the process is completed.

Figure 6:
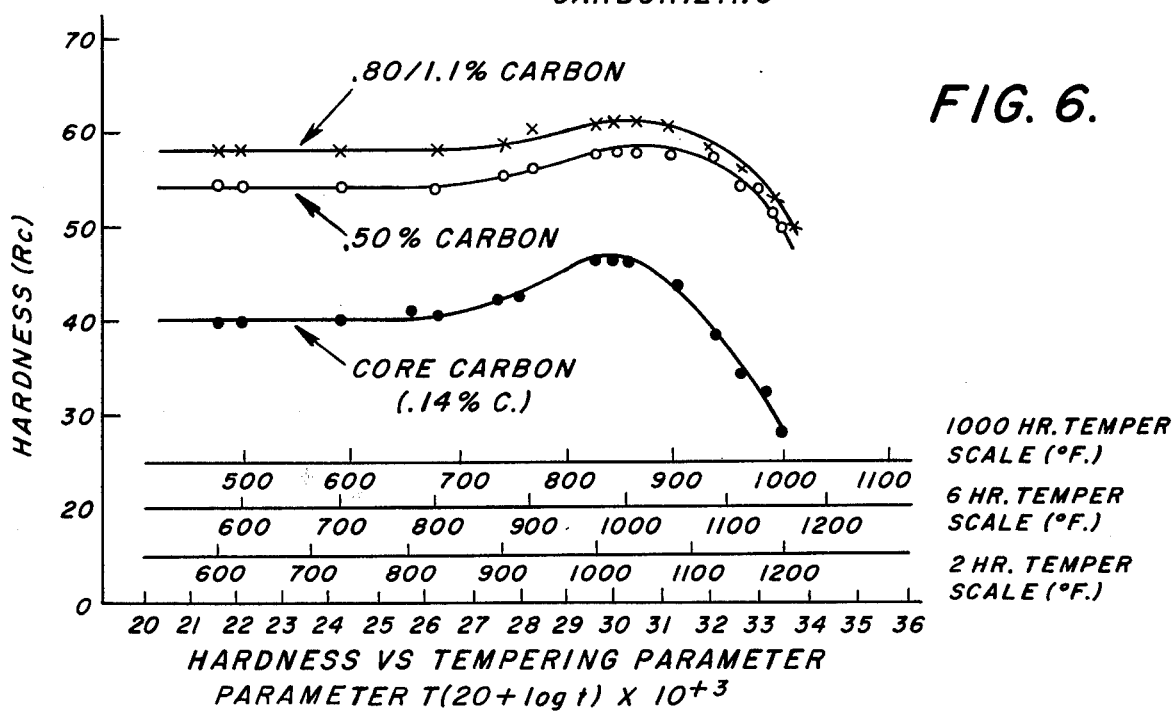
FIG. 6 is a plot of hardness versus temperature for various tempering cycles utilized on workpieces fabricated from the steel of the invention.

In FIG. 6, the effect of tempering temperature on hardness is shown as a function of carbon content. Remembering that the final Rockwell C hardness must be at least 58, it will be appreciated that a carbon content below about 0.50% in the outer case is insufficient, the preferred carbon content being about 1%. With a carbon content of this magnitude, it can be seen that for a 2-hour temper cycle, the maximum hardness is achieved at a temperature of 1000°F which is the recommended temperature. Note that when a 1000-hour temper or service cycle is employed, full hardness is maintained to at least 900°F.

Figure 7:
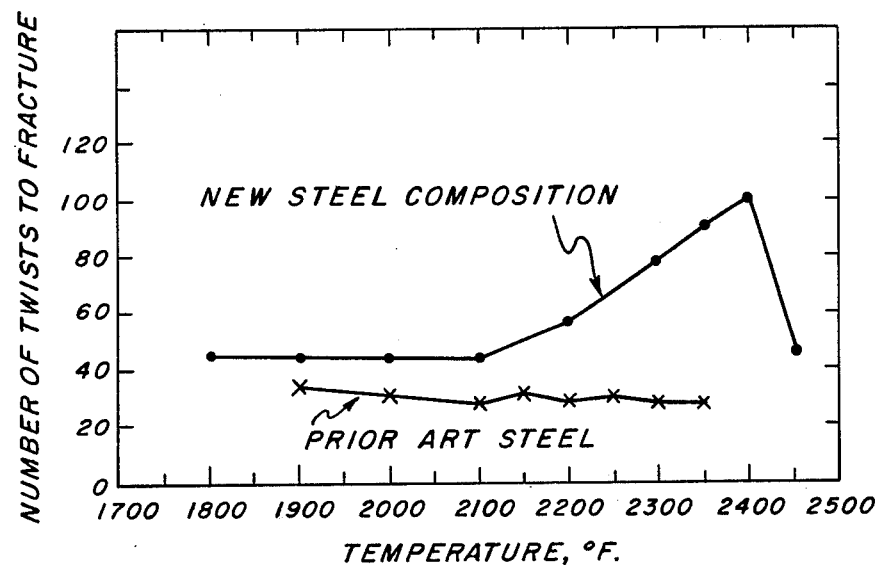
FIG. 7 shows hot twist data for the prior art steel and the steel of the present invention.

The hot twist data of the present invention as compared with a prior art steel is illustrated in FIG. 7. The composition of the prior art steel of Jatczak U.S. Pat. No. 3,382,064 was 0.2% carbon, 0.57% manganese, 0.025% silicon, 1.26% chromium, 5.03% molybdenum and 0.88% vanadium with the balance iron. It did not contain nickel. FIG. 7 shows that the number of twists to fracture for the prior art steel is not much above 34; whereas in the case of the present invention it is always above 40 and at higher temperatures increases to almost 100 twists to fracture. This improved hot twist behavior indicates the steel is readily pierceable.

Although the invention has been shown in connection with a certain specific embodiment, it will be readily apparent to those skilled in the art that various changes in composition and processing steps can be made to suit requirements without departing from the spirit and scope of the invention.

We claim as our invention:

1. A process for heat treating an alloy steel consisting essentially of about 0.1 to 0.3% carbon, 0.2 to 1% manganese, 0.2 to 0.6% silicon, up to 1.2% chromium, 2.5 to 3.5% nickel, 4 to 6% molybdenum, 0.25 to 0.85% vanadium and the remainder substantially all iron, said heat treating process comprising carburizing the steel, heating said steel to a temperature of about 2000°F followed by quenching, and subsequent refrigeration to −100°F to −120°F.

2. The method of claim 1 including the step of tempering said steel after refrigeration by multiple tempers at 1000°F for about 2 hours, followed by cooling to room temperature between each temper cycle.

* * * * *